United States Patent [19]

Miura et al.

[11] 4,191,731
[45] Mar. 4, 1980

[54] WET PROCESS USING STEEL SLAG FOR WASTE GAS DESULFURIZATION

[75] Inventors: Yoshiaki Miura; Masataka Kaneyasu; Akira Okamoto, all of Kitakyushu, Japan

[73] Assignee: Nippon Steel Corporation, Tokyo, Japan

[21] Appl. No.: 869,221

[22] Filed: Jan. 13, 1978

[51] Int. Cl.² .............................................. C01B 17/00
[52] U.S. Cl. ..................................... 423/242; 423/166
[58] Field of Search ................... 423/242, 166, 242 A, 423/242 R, 244 A, 244 R

[56] References Cited

U.S. PATENT DOCUMENTS

| | | | |
|---|---|---|---|
| 3,906,079 | 9/1975 | Tamaki et al. | 423/242 |
| 4,073,864 | 2/1978 | Atsukawa et al. | 423/242 |

Primary Examiner—O. R. Vertiz
Assistant Examiner—Gregory A. Heller
Attorney, Agent, or Firm—Wenderoth, Lind & Ponack

[57] ABSTRACT

In a wet process using a steel slag for waste gas desulfurization, the desulfurization is carried out according to the following formula:

$$\log pH \leq -7.6 \cdot SO_2(\%)/(O_2(\%)) + 0.90,$$

in which pH is the pH value of the aqueous slurry for absorption contained in an absorber; $SO_2(\%)$ is the concentration of the sulfurous acid gas contained in the waste gas at the inlet of the absorber; and $O_2(\%)$ is the concentration of the oxygen contained in the waste gas at the inlet of the absorber. This process has an excellent effect of desulfurization and an economical advantage.

4 Claims, 7 Drawing Figures

WET PROCESS USING STEEL SLAG FOR WASTE GAS DESULFURIZATION

DETAILED DESCRIPTION OF THE INVENTION

This invention relates to a wet process using a steel slag for waste gas desulfurization.

Slag can roughly be classified into a blast furnace slag and such a steel slag as a converter slag, an open-hearth furnace slag or an electric furnace slag. A part of the slag has been used as a material for iron making, a material for fertilizer or a material for road, etc. However, most of it has been employed for reclamation, and the value of use of the slag is, thus, low. It is, however, well known that slag contains calcium oxide (CaO) in an amount of 40 to 50% by weight and it can be employed to remove the sulfurous acid gas (SO₂) contained in a waste gas, which is hereinafter referred to as a slag process.

In such a process, the slag is crushed, or crumbled, into fine powders and is suspended in water so that an aqueous slurry for absorption is prepared. The slurry thus prepared is supplied to an absorber wherein a waste gas introduced thereto is washed with the slurry so that the sulfurous acid gas is removed from the waste gas, that is, the waste gas is desulfurized, according to the following equation 1.

$$CaO\ (slag) + SO_2 = CaSO_3 \ldots \quad 1$$

The calcium sulfite (CaSO₃) is in general oxidized to gypsum and then is recovered since the use of the CaSO₃ itself is limited. In case of a wet process using lime for waste gas desulfurization, which is hereinafter referred to as a lime-gypsum process, the slurry containing calcium sulfite (CaCO₃) is drawn out of the absorber and air-oxidized in oxidizing equipment whereby gypsum is produced and then the gypsum is recovered.

On the other hand, in case of a slag process, the slag contains Al₂O₃, SiO₂, Fe₂O₃ and MnO, etc. and these components have catalytic activity for oxidation. Therefore, the reaction shown by the following equation 2 progresses simultaneously with the absorption reaction of the above equation 1 under the condition that the components act as catalysts whereby the calcium sulfite (CaSO₃) is oxidized into gypsum in the absorber and is recovered, as such.

$$CaSO_3 + \tfrac{1}{2}O_2 = CaSO_4 \ldots \quad 2$$

The slag process, thus, has a great advantage of making it unnecessary to provide the oxidizing equipment ordinarily required in the lime-gypsum process, since absorption of sulfurous acid gas and production of gypsum concurrently take place in the absorber.

The following methods have been reported as the practical operations for the wet-type waste gas desulfurization using slag.

(1) In the case of using one absorber, the operation of the absorber is conducted while the pH value of an aqueous slurry for absorption in the abosrber is controlled to the range between 1.5 and 4.

(2) In the case of using two absorbers, the operations of the absorbers are carried out while the pH value of an aqueous slurry contained in the absorber in the upstream of the waste gas is controlled to an acid region and that of the downstream in the waste gas is controlled to a neutral or alkaline region.

Both the methods are characterized in that the absorber from which the spent aqueous slurry is drawn out to recover gypsum is operated such that the pH value of the aqueous slurry therein is being controlled to the acid region of 3 or so. In general the lower the pH value of the aqueous slurry is, the faster becomes the oxidizing reaction of CaSO₃ to gypsum independently of the presence of an oxidizing catalyst. Therefore, the absorber is operated in the acid condition in order to produce gypsum within the absorber. Thus the slag process results in an effective use of the slag having poor utility and is considered to be an economical process. There are, however, some disadvantages in the aforesaid conventional methods since the absorber from which the spent slurry is drawn to recover gypsum is ordinarily operated under the condition that the pH value of the aqueous slurry therein is kept at 3 or so. The following are the problems which should be overcome in the future.

(1) The materials for the absorber and for the apparatus associated therewith are easily corroded since the pH value of the agulous slurry for absorption is low. Accordingly, troubles due to the corrosion arise. In addition in order to avoid such troubles expensive materials and apparatus have to be used for the absorbers, which causes an increase in costs of equipment.

(2) As is well known, the ratio of absorption of the SO₂ gas is reduced as the pH value of the aqueous slurry for absorption is lower. Accordingly, the capacity of the absorber must be increased in order to maintain a high rate or ratio of absorption in spite of the low pH value of the aqueous slurry. In this case, a big absorber, for example, the height of which has been increased, must be employed therefor, which causes an increase in costs of equipments and of operation.

As set forth above, both blast furnace slag and steel slag have been used in the slag process. They are, however, different in chemical components as described later and, especially, the desulfurization ratio and the pH value of steel slag are higher than those of the blast furnace slag. Therefore, the use of the steel slag is superior in practice of the slag process to that of the blast furnace slag.

It is therefore an object of this invention to overcome the aforesaid disadvantages which have been encountered in the conventional methods.

It is another object of this invention to carry out the desulfurization of a waste gas very efficiently by using the aqueous slurry of steel slag and keeping the pH value thereof at high level.

It is still another object of this invention to provide a wet process for waste gas desulfurization having an economical advantage industrially and commercially by maintaining the pH value of an aqueous slurry in a high level.

According to this invention there is provided a wet process using a steel slag for a waste gas desulfurization wherein the waste gas is continuously introduced into at least one absorber and simultaneously therewith an aqueous slurry of the steel slag is supplied thereto in which the desulfurization of the waste gas is carried out, which comprises conducting the desulfurization under the condition of log pH ≦ −7.6·SO₂(%)/(O₂(%)) + 0.90, wherein pH is the pH value of the aqueous slurry of the steel slag contained in the absorber: SO₂(%) is the concentration of the sulfurous acid gas contained in the waste gas at the inlet of the absorber; and $O_2(\%)$ is the concentration of the oxygen therein at the inlet of the absorber.

According to this invention there is further provided a wet process using a steel slag for waste gas desulfurization consisting essentially of introducing the waste gas continuously into at least one absorber to desulfurize the waste gas by an aqueous slurry of steel slag and simultaneously therewith to produce gypsum, discharging a part of the spent slurry from the absorber to recover gypsum and supplying fresh aqueous slurry to the absorber at the same rate as the spent slurry is discharged from the absorber, which comprises conducting the desulfurization of the waste gas under the condition of $\log pH \leq -7.6 \cdot SO_2(\%)/(O_2(\%)) + 0.90$, wherein pH is the pH value of the aqueous slurry of the steel slag contained in the absorber; $SO_2(\%)$ is the concentration of the sulfurous acid gas contained in the waste gas at the inlet of the absorber; and $O_2(\%)$ is the concentration of the oxygen contained in the waste gas at the inlet of the absorber.

In the practice of this invention it is preferable to control the pH value of the aqueous slurry to the range of 4.5 to 8.0, more preferably 5.0 to 6.5 and it is preferable to keep the $SO_2(\%)/O_2(\%)$ at 0.033 or less, more preferably 0.026 or less.

A preferable embodiment of this invention is further described in detail with reference to the accompanying drawings.

Figure 1:
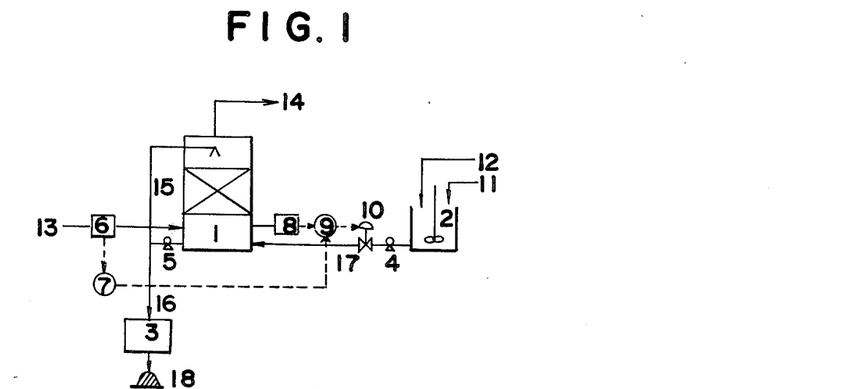
FIG. 1 is a diagram for explaining a preferable embodiment according to this invention.

In FIG. 1 a waste gas 13 containing sulfurous acid gas ($SO_2$) is introduced into an absorber 1 and it is therein washed by an aqueous slurry for absorption 15 containing steel slag which is being circulated by a pump 5 so that the $SO_2$ is removed from the waste gas and then the waste gas is discharged from a smokestack as a clean gas 14.

On the other hand, the powdery or slurry-type steel slag 12 such as converter slag, open-hearth furnace slag and electric furnace slag and the water 11 are introduced into a vessel for preparing aqueous slurry for absorption 2 where they are subjected to stirring, mixing and adjustment of concentration so that an aqueous slurry for absorption is prepared. The aqueous slurry thus prepared is fed to the absorber 1 by a pump 4. In the absorber 1 the waste gas is washed so that the $SO_2$ therein is absorbed by the aqueous slurry 15 while the aqueous slurry is being circulated by the pump 5. The contact of the waste gas and the aqueous slurry may be conducted either concurrently or counter-currently. In this case, the values of the concentrations of the $SO_2$ and the $O_2$ contained in the waste gas at the inlet of the absorber 1 detected by a $SO_2$ and $O_2$ detector 6 are introduced into a pH-setting device 7 so that the pH value of the aqueous slurry is properly set according to the following formula 3.

$$\log pH \leq -7.6 \cdot SO_2(\%)/(O_2(\%)) + 0.90 \ldots \qquad 3,$$

in which pH is the pH value of the aqueous slurry contained in the absorber, $SO_2(\%)$ is the concentration of the $SO_2$ contained in the waste gas at the inlet of the absorber and $O_2(\%)$ is the concentration of the $O_2$ contained in the waste gas at the inlet of the absorber.

A pH controller 9 operates a control valve 10 on the basis of the pH value set by the pH-setting device 7 and the pH value of the aqueous slurry detected by a pH detector 8 so as to control, or adjust, the amount of fresh aqueous slurry 17 to be supplied to the absorber 1 and, thereby, to control the pH value of the aqueous slurry in the absorber 1 to the value set by the pH-setting device 7. The absorption reaction, i.e. desulfurization reaction, and the reaction for producing gypsum are simultaneously conducted in the above manner.

In this connection if the concentration of the $SO_2$ contained in the waste gas and that of the $O_2$ contained in the waste gas at the inlet of the absorber are stable, it is unnecessary to provide the $SO_2$ and $O_2$ detector 6 and the pH-setting device 7. All that is required is to preliminarily set the pH value according to the formula 3 and then to introduce this pH value into the pH controller 9. A part 16 of the aqueous slurry spent, or circulated for absorption in the absorber, is drawn, or discharged, from the absorber 1 to a step 3 for recovering gypsum and, after the part 16 is subjected to a neutralizing treatment, etc. gypsum 18 is recovered therefrom. The water separated in the step 3 may be returned to the vessel 2 so that it can be reused as water 11.

FIG. 1 shows the case of using one absorber but, of course, a plurality of absorbers can be employed, if necessary. For example, in case of using two absorbers, there are two systems, namely a series system and a parallel system.

In the series system the waste gas desulfurized in a first absorber is fed to a second absorber in which the waste gas is further desulfurized and it is discharged therefrom while the aqueous slurry supplied to the second absorber is supplied in series therefrom to the first absorber in the opposite direction to the current of the waste gas. In this system only the pH value of the aqueous slurry contained in the final absorber along the current of the slurry, namely the absorber from which a part of the spent slurry is discharged to the step for recovering gypsum, for example the first absorber in this case, may be controlled to the range defined by the formula 3, preferably the range of 4.5 to 8.0.

On the other hand, in the parallel system the current of the waste gas is the same as that in the above series system but the aqueous slurry is supplied independently to each of the first and second absorbers. In this case, each of the pH values of the aqueous slurries in the absorbers can be properly controlled independently to the range satisfying the formula 3. The advantage of providing a plurality of absorbers is that the height of each of the absorbers can be decreased so that the whole equipment for waste gas desulfurization can be made compact.

In setting of pH value of the aqueous slurry in the absorber the pH value can be conducted manually according to the formula 3 after the concentrations of the $SO_2$ and of the $O_2$ contained in the waste gas at the inlet of the absorber are detected. It is more preferable to set the pH value automatically according to the formula 3 after the detection. In the case if either the concentration of the $SO_2$ or that of the $O_2$ contained in the waste gas at the inlet of the absorber is stable, it is, of course, possible to introduce the stable concentration into the pH setting device as a fixed value without the detection of the stable concentration. The control of the pH value of the aqueous slurry after setting the pH value can be conducted automatically by an ordinary means, for example the means shown in FIG. 1. In addition, if a cooling column or unit is provided before the absorber, the $SO_2$ and $O_2$ detector 6 may be positioned at the inlet of the cooling column since the amount of absorption of the $SO_2$ contained in the waste gas is small in the cooling column.

In general the temperature of the waste gas is considerably high and, therefore, the cooling column wherein water is circulated is arranged before the absorber, or the absorber which also serves as a cooling column is employed. In case that the cooling column is provided independently of the absorber, the dusts contained in the waste gas are removed in the cooling column and are deposited in the circulating water of the cooling column. Therefore, the circulating water must be properly drawn from the cooling column. One analysis example shows that, when the waste gas from sintering is stripped of its dust by cyclon and is introduced into the cooling column, the solid component contained in the circulating water drawn from the cooling column contains gypsum in an amount of as much as 54% by weight (the concentration of the calcium oxide contained in the water-insoluble dusts involved in the waste gas from sintering is as high as 25%). This results in that the gypsum recovered from the circulating water is hardly different in grade from the gypsum recovered from the absorber, the components of which are shown in Table 2. Even if the circulating water drawn from the cooling column is mixed with the spent aqueous slurry to be drawn from the absorber and gypsum is recovered therefrom, the grade of the gypsum so recovered is hardly injured since the amount of the gypsum contained in the circulating water is small and there is little difference in grade between the gypsum recovered from the circulating water and that recovered from the spent aqueous slurry as mentioned above. In addition, when the waste gas is directly introduced into the absorber which also serves as a cooling column, the dusts contained in the waste gas are also removed in the absorber and they are mixed with the spent aqueous slurry to be discharged therefrom for recovering gypsum. However, the grade of the gypsum recovered from the spent aqueous slurry is not injured for the same reasons as the above.

In the practice of this invention it is not that the concentration of the aqueous slurry of the slag to be employed is limited to a particular range from the viewpoint of the absorption reaction of $SO_2$ and/or the reaction for producing gypsum. Therefore, the concentration of the aqueous slurry may be kept in the range capable of ordinarily handling as an aqueous slurry but it is preferable to employ an aqueous slurry containing slag in an amount of 3 to 15% by weight in the practice of this invention.

The principle of this invention is described below on the basis of experimental results.

The experiment conditions are as follows:
The unit for experiment used:
a tray tower.
The waste gas used and the volume thereof:
a combustion waste gas (1,000 $Nm^3/H$).
The desulfurizing agents used:
a steel slag (a converter slag) and a blast furnace slag.

The reasons why the steel slag is employed in this invention are described below.

Slag can roughly be classified to a steel slag and a blast furnace slag, as previously stated, and the differences therebetween are as follows:

(1) The differences in chemical ingredients:
One example of analysis of various slags is shown in Table 1. The basicity ($CaO/SiO_2$) of the steel slag is as high as 2 to 4 but that of the blast furnace slag is as low as about 1.2. The steel slag contains CaO in an amount of 40 to 50% while the blast furnace slag contains it in an amount of 40% or so. Thus, the former is slightly higher in CaO content than the later. As to the other ingredients the steel slag is higher in Fe and MnO contents than the blast furnace slag but the former is lower in $SiO_2$ and $Al_2O_3$ contents that the latter.

Figure 2:
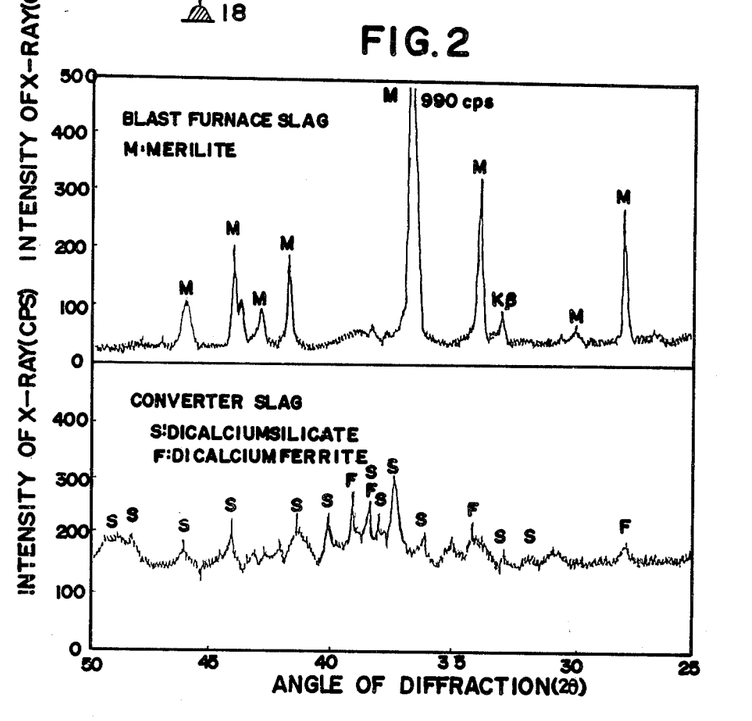
FIG. 2 is a graph showing the results of experiment according to this invention.

(2) The difference in composition of mineral:
The steel slag consists mainly of dicalciumsilicate (2 $CaO.SiO_2$) and dicalciumferrite (2 $Cao.Fe_2O_3$) and also contains free lime (CaO) and wustite (FeO), etc. On the other hand, the blast furnace slag consists nearly of merilite ($2CaO.Al_2O_3.SiO_2$ and 2 $CaO.MgO.$ $2SiO_2$). The results of X-ray diffraction of both the slags are shown in FIG. 2, from which the followings are readily understood.

The blast furnace slag has a low background, the peaks of its merilite are very clear and it consists substantially of a single mineral having a good degree of crystallization. On the other hand, the steel slag has a high background, the peaks of its crystals are low and it consists of various minerals having a poor degree of crystallization.

(3) The difference in stability as a mineral:
When the steel slag is left in atmosphere it easily suffers from efflorescence and expansion so that the natural degradation will take place. The steel slag can be, thus, considered to be a relatively unstable mineral. On the other hand, it can be recognized that the blast furnace slag is a stable mineral in view of the fact that it has been employed as a gravel.

As set forth above, though both the steel slag and the blast furnace slag are simply called "slag", they are remarkably different in properties or characteristics. As a result, they show very different behaviours regarding the reactivity in absorbing the $SO_2$ contained in a waste gas by the aqueous slurry of slag. The most one of the differences therebetween is the reaction ratio of the lime contained in the slag. In general the amount of the slag which is required to absorb a fixed amount of the $SO_2$ in the waste gas is increased as the reaction ratio of lime lowers, which causes the enlargement of the equipments for crushing slag, for transporting slag and for recovering gypsum whereby the economical advantage of the process is injured. Accordingly, it is desirable that the reaction ratio of lime is high.

Figure 3:
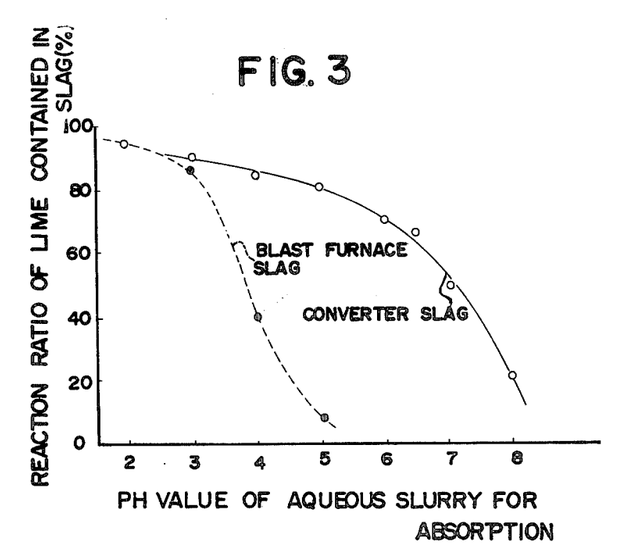
FIG. 3 is a graph showing the relation between the pH value of an aqueous slurry for absorption of a blast furnace slag and the reaction rate, or ratio, of the lime contained in the slag and the relation between the pH value of an aqueous slurry of a converter slag and the reaction ratio of the lime contained in the slag.

As is shown in FIG. 3, even when the pH value of the aqueous slurry of the steel slag is higher than that of the blast furnace slag, the reaction ratio of lime of the former is higher than that of the latter, that is, the lime contained in the steel slag is more easily dissolved than the lime in the blast furnace slag. Consequently, in order to obtain the same reaction ratio of lime the desulfurization in using the steel slag can be carried out at higher pH values than that in using the blast furnace slag and the steel slag is, thus, superior in desulfurization capacity to the blast furnace slag. It is presumed that the difference in reaction ratio of lime between the steel slag and the blast furnace slag results from the aforesaid difference in stability as mineral.

According to FIG. 3, when the pH value of the aqueous slurry of the blast furnace slag is 4.0, the reaction ratio of lime of the slag is about 40%, from which it is understood that in the practical or commercial operation of the absorber the desulfurization using the blast furnace slag must be conducted under the condition that the pH value is 4.0 or less.

Contrary to this, in case of using the steel slag, the desulfurization can be carried out at pH 7.5 or so, assuming that the practical or commercial reaction ratio of lime is 40%. The aqueous slurry of the steel slag has an advantage that it can be employed at a much higher pH value than that of the blast furnace slag. Accordingly, the steel slag is employed as a material for aqueous slurry in this invention.

The greatest advantage of the slag process that the oxidation of lime to gypsum is made possible in the absorber must be maintained as far as the slag process is carried out. Therefore, the inventors of this invention have made various investigations about the factors governing the oxidation reaction to gypsum in the slag process.

It is known that the ratio of the oxidation reaction of the equation 2 is influenced by the pH value and the temperature of the aqueous slurry for absorption and the partial pressure of the oxygen contained in the waste gas, etc. when a lime is employed as a desulfurizing agent, that is, in the lime-gypsum process. However, there is hardly any such report given about a slag.

Figure 4:
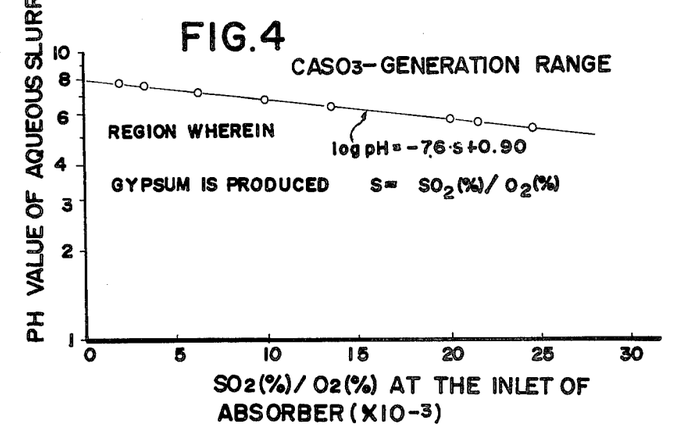
FIG. 4 is a graph showing the range for producing gypsum in the relation between the concentration of the $SO_2(\%)$ in a waste gas/the concentration of the $O_2(\%)$ in the waste gas at the inlet of an absorber and the pH value of an aqueous slurry for absorption.

The inventors of this invention have found from the results of the experiment that, though the rate of the oxidation reaction of the equation 2 in case of using a steel slag is remarkably high due to the presence of the catalysts as compared with that in using the lime, it is not that the reaction for producing gypsum is caused in the absorber under every condition but that there is the specific region in which the reaction in the absorber take place defined by two factors, i.e. the pH value of the aqueous slurry for absorption in the absorber and the $SO_2(\%)/O_2(\%)$ wherein the $SO_2(\%)$ is the concentration of the sulfurous acid gas contained in the waste gas at the inlet of the absorber and the $O_2(\%)$ is the concentration of the oxygen contained therein at the inlet of the absorber. In other words, only when the relation between the pH value of the liquid or aqueous slurry and the $SO_2(\%)/O_2(\%)$ satisfies the region defined by the formula 3, the reaction for producing gypsum is caused in the absorber. FIG. 4 shows the results of the experiment. However, when the relation does not satisfy the formula 3, the $SO_2(\%)/O_2(\%)$ can be adjusted by supplying the waste gas with a source of oxygen such as air to increase the concentration of the $O_2$ in the waste gas.

In the prior reports there is such a report that in an experiment of the slag process of a both system (wherein only a waste gas is continuously introduced into an absorber while the feeding of an aqueous slurry of slag to the absorber and the discharging of the aqueous slurry therefrom are not conducted and the aqueous slurry is circulated in the absorber whereby the waste gas is washed in the absorber and, therefore, the pH value of the aqueous slurry is gradually lowered due to the absorption of the $SO_2$), the reaction for producing gypsum does not take place in the absorber unless the pH value of the aqueous slurry is 5 or less if the waste gas used is one from sintering containing 0.1% $SO_2$ (if $O_2$ is 12%, the $SO_2(\%)/O_2(\%)$ is $8.3 \times 10^{-3}$). It is different from the results of FIG. 4. This, however, results from the difference in experimental process between the experiment conducted by the batch system and the experiment effected by a continuous system (wherein, though the waste gas is continuously introduced into the absorber containing an aqueous slurry of slag and thereby the pH value of the aqueous slurry is reduced, fresh aqueous slurry is also introduced to the absorber to correct the lowering of the pH value and simultaneously therewith the spent aqueous slurry is drawn from the absorber at the same rate as the supply of the fresh aqueous slurry so that the ph value of the slurry is kept constant in the absorber). Accordingly, it is not that the report denies the results of FIG. 4.

As is well known, in case that a lime is employed as a material for an aqueous slurry for absorption, the absorption ratio of sulfurous acid gas ($SO_2$), namely the desulfurization ratio of the waste gas, begins to drop when the pH value of the aqueous slurry becomes 6 or less and, therefore, the operation of the absorber is in general carried out under the condition of the pH value of 6 or more in the lime-gypsum process. The same result as the above has been obtained in the experiment conducted by the inventors of this invention.

In addition, the inventors of this invention have found that, in case that the aqueous slurry of a steel slag is employed as a desulfurizing agent and the experiment is conducted under the same conditions as the case of using a lime, for example the height of absorber and the operation conditions, etc., the absorption ratio becomes lowered when the pH value of the aqueous slurry becomes about 4.5 or less which is slightly lower than that of the case of using a lime. Accordingly, as the absorption ratio to be commercially achieved is 85% or more, the ratio can sufficiently be obtained by keeping the pH value in 4.5 or more. It has also been found that, if the height of the absorber is much increased, the absorption ratio can be kept high even under the condition of the pH value of less than 4.5. However, the increase of the height causes not only the increase in cost of equipments but also the pressure loss of the absorber, i.e. the increase in cost of electric power due to the increase of power for blowing whereby the economical advantage of this invention is injured. Accordingly, even in case of employing a steel slag, the absorber should be operated under the condition that the pH value of the aqueous slurry is kept as high as possible in order to increase the absorption ratio and to effectively utilize a great advantage owing to using a steel slag that the gypsum can be produced in the absorber without providing any oxidizing equipment independently.

Furthermore, the inventors of this invention have also studied about the optimum conditions for carrying out this invention.

Figure 5:
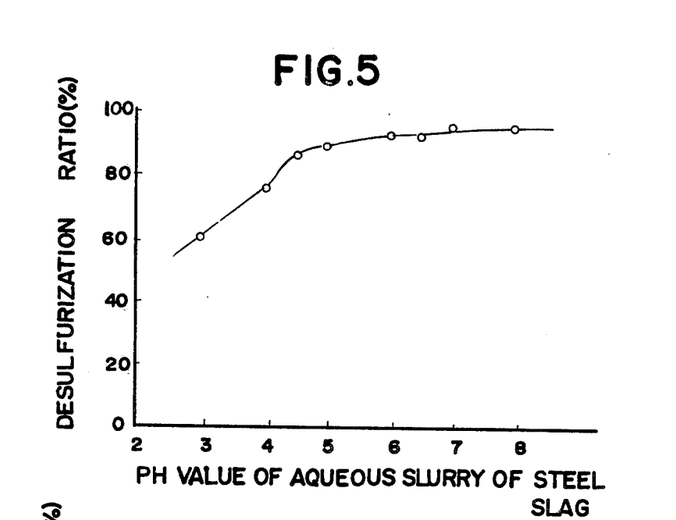
FIG. 5 is a graph showing the relation between the pH value of the aqueous slurry of a steel slag and the desulfurization ratio (%).

FIG. 5 shows the relation between the pH value of the aqueous slurry and the absorption ratio, i.e. the desulfurization ratio, in case of using a steel slag, from which it is noted that the practical or commercial range of the pH value is 4.5 or more and that, when the pH value becomes 5 or less, the absorption ratio tends to drop. However, the drop of the desulfurization ratio is not so drastic as that of the case of using a lime and the desulfurization ratio in using a steel slag is kept in 60% or so even when the pH value is 3.0. This results from that when the pH value becomes low, the Fe, Al or Mn, etc. contained in the steel slag react with the $SO_2$ in the waste gas. It is the most economical that the desulfurization is carried out in the pH range of the aqueous slurry wherein the desulfurization ratio nearly remains on the same level since it does not cause the enlargement of the absorber, etc. Accordingly, as is understood from FIG. 5, it is the most preferable that the pH value of the aqueous slurry is 5 or more.

In addition, the upper limit of the pH value is 8, more preferable 6.5, from the viewpoint of the practical reaction ratio of lime.

Figure 6:
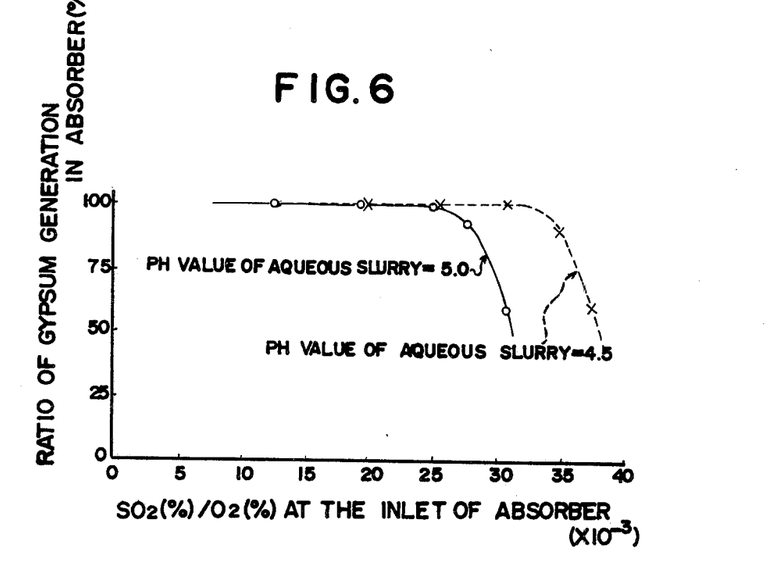
FIG. 6 is a graph showing the relation between the concentration of the $SO_2(\%)$ in a waste gas/the concentration of the $O_2(\%)$ in the waste gas at the inlet of an absorber and the ratio of gypsum generation (%) in the absorber.

Next, the optimum range of the $SO_2(\%)/O_2(\%)$ is as follows:

FIG. 6 shows the relation between the ratio of gypsum generation, namely the ratio for producing gypsum, in the absorber and the $SO_2(\%)/O_2(\%)$ under the condition that the pH values of the aqueous slurry are 5.0 and 4.5, from which it is readily understood that the optimum range of the $SO_2(\%)/O_2(\%)$ is 0.026 or less when the pH value is 5.0 and it is 0.033 or less when the pH value is 4.5.

From the above results it is concluded that the conditions necessary for satisfying both the desulfurization ratio and the reaction ratio of lime and necessary for producing gypsum in the absorber, namely the optimum conditions of desulfurization, are the $SO_2(\%)/O_2(\%)$ at the inlet of the absorber $\leq 0.033$, more preferably 0.026 and the pH value of the aqueous slurry in the absorber = 4.5 to 8, more preferably 5.0 to 6.5 in case of using a steel slag as a desulfurizing agent.

As is described above, the economical advantage of a wet process using a steel slag for waste gas desulfurization can be increased up to the maximum by providing this invention.

According to this invention the absorber can be operated under the condition of a very high pH value so that a high desulfurization ratio can be achieved without increasing the costs of equipments for absorbing excessively and the occurrences of the troubles of the equipment can be prevented as well as the degradation of the materials for equipments to be employed.

Examples of this invention are described below.

EXAMPLE 1

A desulfurization of a waste gas is conducted according to the steps in FIG. 1.

The absorber used: a tray tower.

The desulfurizing agent used: a converter slag, an open-hearth furnace slag and an electric furnace slag, the components of which are shown in Table 1.

The waste gas used: a combustion waste gas, the volume introduced of which is 1,000 $Nm^3/H$.

As noted from Table 2, a high desulfurization ratio has been obtained. In addition, the reaction product recovered has been a complete gypsum as shown in Table 2.

EXAMPLE 2

Figure 7:
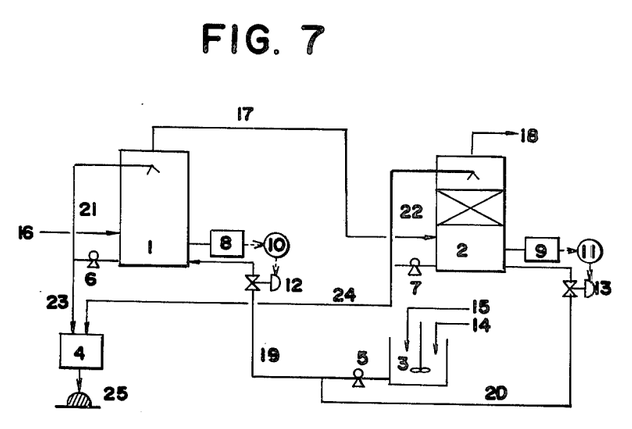
FIG. 7 is a diagram of another embodiment according to this invention.

In this example two absorbers, i.e. a first and a second absorbers, are employed and they are operated in parallel according to the steps shown in FIG. 7, that is the waste gas introduced to the first absorber is fed to the second absorber while an aqueous slurry of slag is supplied separately to each of the first absorber and the second absorber.

In FIG. 7, 1 is a first absorber and 2 is a second absorber, 3 being a vessel for preparing an aqueous slurry of slag, 4 being a step for recovering gypsum, 5, 6 and 7 being pumps, 8 and 9 being pH detectors, 10 and 11 being pH controllers, 12 and 13 being control valves, 14 being water, 15 being a steel slag, 16 being a waste gas, 17 being a waste gas discharged from the first absorber, 18 being a clean gas, 19 to 24 being currents of the aqueous slurry, 25 being gypsum.

The desulfurization conditions are as follows:

The two absorbers used:
The first absorber is a spraying tower which also serves as a cooling column and the second absorber is a tray tower having less number of trays therein than that of the absorber used in Example 1.

The desulfurizing agent:
A converter slag, the components of which are shown in Table 1.

The waste gas used:
A waste gas from sintering, the volume introduced of which is 1,000 $Nm^3/H$.

The concentrations of the $SO_2(\%)$ and the $O_2(\%)$ contained in the waste gas at the inlet of the first absorber have been stable and the $SO_2(\%)/O_2(\%)$ has sufficiently satisfied the formula 3. Therefore, the first and second absorbers have been operated with the fixed pH value of the aqueous slurry in each of the first and second absorbers, i.e. under the condition that the pH value of the aqueous slurry of the first absorber is 5.0 and that of the second absorber is 6.5 without conducting the pH control of each absorber due to the fractuation of the $SO_2(\%)/O_2(\%)$ at the inlets of the absorbers.

As shown in Table 3, a remarkably high desulfurization ratio has been obtained and the reaction product recovered has been a complete gypsum. In the case, the desulfurization ratio in each of the first and second absorbers is lower than that in the absorber of example 1 since the first absorber is the spraying tower and the second absorber is the tray tower having less number of tray therein than that of the absorber in example 1, that is each of the absorber is simplified as compared with the absorber used in example 1.

Table 1

| | CaO % | $SiO_2$ % | Total Fe % | $Al_2O_3$ % | MgO % | MnO % | CaO/SiO |
|---|---|---|---|---|---|---|---|
| Steel slag (converter slag) | 42.8 | 19.7 | 15.4 | 3.4 | 3.7 | 5.3 | 2.17 |
| Steel slag (open-hearth furnace slag) | 41.2 | 16.4 | 20.4 | 2.8 | 5.9 | 5.2 | 2.51 |
| Steel slag electric furnace slag | 43.6 | 12.5 | 20.7 | 2.0 | 7.0 | 3.4 | 3.49 |
| Blast | | | | | | | |

Table 1-continued

| | CaO % | SiO$_2$ % | Total Fe % | Al$_2$O$_3$ % | MgO % | MnO % | CaO/SiO |
|---|---|---|---|---|---|---|---|
| furnace slag | 40.1 | 33.7 | 0.8 | 15.3 | 6.1 | 0.8 | 1.19 |

Table 2

| Desulfurizing agent | Aqueous slurry pH | SO$_2$ at the inlet of absorber PPM | SO$_2$ at the outlet of absorber PPM | Desulfurization ratio % | O$_2$ % | SO$_2$(%)/O$_2$(%) | Components of reaction product (%) | | | | | | | Reaction ratio of lime % |
|---|---|---|---|---|---|---|---|---|---|---|---|---|---|---|
| | | | | | | | CaSO$_4$ 2H$_2$O | CaO | SiO$_2$ | Total Fe | MnO | Al$_2$O$_3$ | MgO | |
| converter slag | 5.5 | 790 | 69 | 91.3 | 8.1 | 0.010 | 60.3 | 5.9 | 12.1 | 9.1 | 2.7 | 2.1 | 2.5 | 76.9 |
| open-hearth furnace slag | 5.5 | 780 | 67 | 91.4 | 8.1 | 0.010 | 58.1 | 5.9 | 9.9 | 12.2 | 3.0 | 1.9 | 3.2 | 76.2 |
| electric furnace slag | 5.5 | 830 | 76 | 90.8 | 7.8 | 0.011 | 61.4 | 5.8 | 7.6 | 12.5 | 1.7 | 1.3 | 3.7 | 77.5 |

Table 3

| First absorber | | | | | Second absorber | | |
|---|---|---|---|---|---|---|---|
| SO$_2$ at the inlet of absorber PPM | SO$_2$ at the outlet of absorber PPM | % | SO$_2$(%) O$_2$(%) | aqueos slurry pH | SO$_2$ at the outlet of absorber PPM | SO$_2$(%) O$_2$(%) | aqueous slurry pH |
| 490 | 140 | 14.8 | 0.003 | 5.0 | 18 | 0.001 | 6.5 |

| Desulfurization ratio % | Components of reaction product (%) | | | | | | Reaction ratio of lime % |
|---|---|---|---|---|---|---|---|
| | CaSO$_4$ 2H$_2$O | CaO | SiO$_2$ | Total Fe | MnO | Al$_2$O$_3$ | MgO | |
| 96.3 | 56.6 | 7.7 | 12.2 | 9.5 | 3.5 | 2.3 | 2.1 | 70.5 |

Remarks:
In Table 3 the SO$_2$(%) at the inlet of the second absorber is the same as that at the outlet of the first absorber and the O$_2$(%) in the second absorber is the same as that in the first absorber.

We claim:

1. In a wet process using slag for waste gas desulfurization consisting essentially of introducing the waste gas continuously into at least one absorber to desulfurize the waste gas by an aqueous slurry of the slag and simultaneously therewith to produce gypsum, discharging a part of the spent slurry from the absorber to recover gypsum and supplying fresh aqueous slurry to the absorber at the same rate as the spent slurry is discharged from the absorber, the improvement wherein the slag is steel slag and the desulfurization of the waste gas is conducted under the condition wherein log pH $\leq -7.6$ SO$_2$(%)/(O$_2$(%))+0.90, wherein pH is the pH value of the aqueous slurry of the steel slag contained in the absorber and is in the range of 4.5 to 8; SO$_2$(%) is the concentration of the solfurous acid gas contained in the waste gas at the inlet of the absorber; O$_2$(%) is the concentration of the oxygen contained in the waste gas at the inlet of the absorber; and wherein the SO$_2$(%)/O$_2$(%) is 0.033 or less.

2. A process according to claim 1 in which the SO$_2$(%)/O$_2$(%) is 0.026 or less and the pH value of the aqueous slurry is 5 to 6.5.

3. A process according to claim 1 in which the desulfurization is carried out in two stages.

4. A process according to claim 1 in which two absorbers are employed for desulfurization.

* * * * *